(12) United States Patent
Muninder

(10) Patent No.: US 8,873,811 B2
(45) Date of Patent: Oct. 28, 2014

(54) METHOD AND APPARATUS FOR FACE TRACKING UTILIZING INTEGRAL GRADIENT PROJECTIONS

(75) Inventor: Veldandi Muninder, Bangalore (IN)

(73) Assignee: Nokia Corporation, Espoo (FI)

( * ) Notice: Subject to any disclaimer, the term of this patent is extended or adjusted under 35 U.S.C. 154(b) by 190 days.

(21) Appl. No.: 13/494,316

(22) Filed: Jun. 12, 2012

(65) Prior Publication Data

US 2013/0004025 A1    Jan. 3, 2013

(30) Foreign Application Priority Data

Jun. 30, 2011 (IN) ............................ 2228/CHE/2011

(51) Int. Cl.
*G06K 9/00* (2006.01)
*G06K 9/46* (2006.01)
*G06T 7/20* (2006.01)

(52) U.S. Cl.
CPC .......... *G06K 9/00261* (2013.01); *G06K 9/4647* (2013.01); *G06T 2207/20068* (2013.01); *G06T 2207/30201* (2013.01); *G06T 7/20* (2013.01)
USPC ........................................................ 382/118

(58) Field of Classification Search
None
See application file for complete search history.

(56) References Cited

U.S. PATENT DOCUMENTS

| 5,768,430 | A | 6/1998 | Takashima et al. | |
|---|---|---|---|---|
| 6,633,655 | B1 * | 10/2003 | Hong et al. | 382/118 |
| 7,155,036 | B2 * | 12/2006 | Li | 382/118 |
| 7,218,759 | B1 * | 5/2007 | Ho et al. | 382/118 |
| 7,460,693 | B2 * | 12/2008 | Loy et al. | 382/118 |
| 8,224,108 | B2 * | 7/2012 | Steinberg et al. | 382/255 |
| 8,351,712 | B2 * | 1/2013 | Lee | 382/224 |
| 8,649,604 | B2 * | 2/2014 | Steinberg et al. | 382/190 |
| 2006/0210121 | A1 * | 9/2006 | Nakano et al. | 382/117 |
| 2008/0075336 | A1 * | 3/2008 | Luo et al. | 382/118 |
| 2008/0192980 | A1 * | 8/2008 | Park et al. | 382/103 |
| 2008/0259218 | A1 * | 10/2008 | Kondo et al. | 348/700 |
| 2008/0267458 | A1 * | 10/2008 | Laganiere et al. | 382/118 |

(Continued)

FOREIGN PATENT DOCUMENTS

| EP | 0967574 A2 | 12/1999 |
|---|---|---|
| WO | 2011/161307 A1 | 12/2011 |

OTHER PUBLICATIONS

Garcia-Mateos, "Refining Face Tracking with Integral Projections", Lecture Notes in Computer Science, vol. 2688, 2003, pp. 360-368.

(Continued)

*Primary Examiner* — Nirav G Patel
*Assistant Examiner* — Oneal R Mistry
(74) *Attorney, Agent, or Firm* — Harrington & Smith

(57) ABSTRACT

A method, apparatus and computer program product are provided for estimating and verifying translation motion and/or a scaling factor between face regions in respective frames during face tracking. A method determines translation motion between face regions in two successive frames based upon integral gradient projections of a face region in a first frame and a corresponding window in a second frame. The method also verifies the translation motion between the first and second frames utilizing integral gradient projections. A method also determines a transfer function relating integral projection curves of a face region in a first frame that has a predefined position and a predetermined size and a co-located window of same size in a second frame, determines a scaling factor based upon the transfer function and then verifies the scaling factor utilizing integral gradient projections.

21 Claims, 5 Drawing Sheets

(56) References Cited

U.S. PATENT DOCUMENTS

| | | | |
|---|---|---|---|
| 2009/0122866 A1 | 5/2009 | Crawford et al. | |
| 2010/0189358 A1* | 7/2010 | Kaneda et al. | 382/195 |
| 2011/0019003 A1* | 1/2011 | Asa et al. | 348/159 |
| 2013/0010095 A1* | 1/2013 | Aoki et al. | 348/77 |
| 2013/0022277 A1* | 1/2013 | Morishita | 382/201 |
| 2013/0108154 A1* | 5/2013 | Miyano | 382/159 |

OTHER PUBLICATIONS

Bosco et al., "Digital Video Stabilization through Curve Warping Techniques", IEEE Transactions on Consumer Electronics, vol. 54, Issue 2, May 2008, pp. 220-224.

Adams et al., "Viewfinder Alignment", Eurographics, Computer Graphics Forum, vol. 27, Issue 2, 2008, 10 pages.

Lopez et al., "Face Localization in Color Images Using Dynamic Time Warping and Integral Projections", Proceedings of International Joint Conference on Neural Networks, Aug. 12-17, 2007, 5 pages.

International Search Report and Written Opinion received for corresponding International Patent Application No. PCT/FI2012/050517, dated Oct. 11, 2012, 14 pages.

Garcia-Mateos et al., "A Fast and Stable Facial Interface Using Integral Projections", Pattern Recognition and Image Analysis, vol. 17, Issue 4, Dec. 2007, pp. 462-469.

Puglisi et al., "Fast Block Based Local Motion Estimation for Video Stabilization", IEEE Computer Society Conference on Computer Vision and Pattern Recognition Workshops, Jun. 20-25, 2011, pp. 50-57.

Sobottka et al., "A Fully Automatic Approach to Facial Feature Detection and Tracking", Audio- and Video-based Biometric Person Authentication, Lecture Notes in Computer Science, vol. 1206, 1997, pp. 77-84.

"Face detection Using Integral Projection Models", Garcia-Mateos, Gines, et al., http://citeseerx.ist.psu.edu/viewdoc/summary?doi=10.1.1.5.4933, Apr. 22, 2014.

"Refining Face Tracking with Integral Projections", Garcia-Mateos, Gines, http://citeseer.uark.edu:8080/citseerx/viewdoc/summary;jsessionid= . . . , Apr. 23, 2014.

* cited by examiner

METHOD AND APPARATUS FOR FACE TRACKING UTILIZING INTEGRAL GRADIENT PROJECTIONS

TECHNOLOGICAL FIELD

An example embodiment of the present invention relates generally to face tracking and, more particularly, to face tracking utilizing integral gradient projections for estimating translation motion and/or a scaling factor.

BACKGROUND

In various image processing applications, it may be desirable to track an object, such as a face, between successive frames in a video. In order to track a face from one frame to the next, the translation motion of the face and the scaling of the face from one frame to the next may need to be determined. However, the determination of the translation motion and the scaling of a face from one image to the next may be a computationally intensive process which may be a challenge, at least for those devices with limited computational resources, to perform in an efficient and timely manner.

Face tracking may be computationally intensive for various reasons. For example, some face tracking techniques analyze an entire frame or at least a relatively large portion of the frame, as opposed to focusing upon the face region. Additionally, or alternatively, some face tracking techniques utilize multi-dimensional searches which further add to the computational requirements. As such, it would be desirable to provide an improved technique for face tracking between frames, such as frames of a video, that provides accurate results with reduced computational requirements.

BRIEF SUMMARY

A method, apparatus and computer program product are provided in accordance with an example embodiment of the present invention in order to provide an improved technique for face tracking. In this regard, the method, apparatus and computer program product of one embodiment may provide for face tracking in a manner that reduces the associated computational requirements while continuing to provide reliable and robust face tracking. Indeed, the method, apparatus and computer program product of one example embodiment may provide for face tracking including the estimation of translation motion and/or a scaling factor between face regions of successive frames utilizing integral projections in a computationally efficient manner. The verification of translation motion and/or a scaling factor between face regions of successive frames is done utilizing the integral gradient projections.

In one embodiment, a method is provided that includes determining a translation motion between face regions of first and second frames based upon respective integral projections of a face region in the first frame that has a predefined position (x0,y0) and a predetermined size and a co-located window of same size in the second frame. The method also includes verifying the translation motion between the first and second face regions belonging to the respective frames. In this regard, the verification includes determining integral gradient projections for the first face region and the window in the second frame following movement of the window by the translation motion between the first and second face regions. The verification also includes determining a distance between the integral gradient projections of the window, following movement by the translation motion, and the face region. Further, the verification includes determining whether the translation motion between the faces in two frames is verified based on a relationship between the distance and a predefined threshold.

A method of one embodiment may also include determining the integral projections of the face region in the first frame in first and second mutually orthogonal directions and determining the integral projections for the window in the second frame in first and second mutually orthogonal directions. In one embodiment, the determination of the translation motion includes shifting respective integral projection curves of the first and second face regions and determining an amount of shift that creates a minimum distance between the respective integral projection curves of the first and second face regions. The determination of the integral gradient projections for the window in the second frame following movement of the window by the translation motion may include determining integral gradient projections for the window in the second frame in first and second mutually orthogonal directions. Additionally, the determination of the integral gradient projections for the face region in the first frame may include determining integral gradient projections for the face region in the first frame in the first and second mutually orthogonal directions. The method of one embodiment may also include redefining the predefined position for other frames based upon the translation motion in an instance in which the translation motion is verified. In a further embodiment, the method may include evaluating a scaling factor between the face region of the first frame and the co-located window of same size in the second frame in an instance in which the translation motion is not verified in that the distance fails to satisfy predefined threshold.

In another embodiment, an apparatus is provided that includes at least one processor and at least one memory including computer program code configured to, with the at least one processor, cause the apparatus to determine a translation motion between first and second face regions based upon respective integral projections of a face region in the first frame that has a predefined position and a predetermined size and a co-located window of same size in the second frame. The at least one memory including the computer program code is also configured to, with the at least one processor, cause the apparatus to verify the translation motion between the first and second face regions. In this regard, the verification includes determining integral gradient projections for the face region in the first frame and the window in the second frame following movement of the window by the translation motion between the first and second face regions. The verification also includes determining integral gradient projections for a face region in the first frame and determining a distance between the integral gradient projections of the window, following movement by the translation motion, and the face region. Further, the verification includes determining whether the translation motion between face regions is verified based on a relationship between the distance and a predefined threshold.

The at least one memory including the computer program code of one embodiment is also configured to, with the at least one processor, cause the apparatus to determine the integral projections of the face region in the first frame in first and second mutually orthogonal directions and to determine the integral projections for the window in the second frame in first and second mutually orthogonal directions. In one embodiment, the determination of the translation motion between face regions includes shifting respective integral projection curves of the first and second frames and determining an amount of shift that creates a minimum distance between the respective integral projection curves of the first and second frames.

The determination of the integral projections for the window in the second frame following movement of the window by the translation motion may include determining integral projections for the window in the second frame in first and second mutually orthogonal directions. Additionally, the determination of the integral projections for the face region in the first frame may include determining integral projections for the face region in the first frame in the first and second mutually orthogonal directions. The at least one memory including the computer program code may also be configured to, with the at least one processor, cause the apparatus to redefine the predefined position for other frames based upon the translation motion in an instance in which the translation motion is verified. In a further embodiment, the at least one memory including the computer program code may also be configured to, with the at least one processor, cause the apparatus to evaluate a scaling factor between the face region of the first frame and the window of the second frame in an instance in which the translation motion is not verified in that the distance fails to satisfy predefined threshold.

In a further embodiment, a computer program product is provided that includes at least one non-transitory computer-readable storage medium having computer-readable program instructions stored therein with the computer-readable program instructions including program instructions configured to determine a translation motion between first and second face regions based upon respective integral projections of a face region in the first frame that has a predefined position and a predetermined size and a co-located window of same size in the second frame The computer-readable program instructions also include program instructions configured to verify the translation motion between the first and second face regions in respective frames. In this regard, the verification includes determining integral gradient projections for the window in the second frame following movement of the window by the translation motion between the first and second face regions. The verification also includes determining integral gradient projections for a face region in the first frame and determining a distance between the integral gradient projections of the window, following movement by the translation motion, and the face region. Further, the verification includes determining whether the translation motion is verified based on a relationship between the distance and a predefined threshold.

In yet another embodiment, an apparatus is provided that includes means for determining a translation motion between first and second face regions based upon respective integral projections of a face region in the first frame that has a predefined position and a predetermined size and a co-located window of same size in the second frame. The apparatus also includes means for verifying the translation motion between the first and second face regions in respective frames. In this regard, the verification includes determining integral gradient projections for the window in the second frame following movement of the window by the translation motion between the first and second face regions. The verification also includes determining integral gradient projections for a face region in the first frame and determining a distance between the integral gradient projections of the window, following movement by the translation motion, and the face region. Further, the verification includes determining whether the translation motion is verified based on a relationship between the distance and a predefined threshold.

In yet a further embodiment, a computer program is provided that, upon execution, is configured to determine a translation motion between first and second face regions based upon respective integral projections of a face region in the first frame that has a predefined position and a predetermined size and a co-located window of same size in the second frame. The computer program is also configured, upon execution to verify the translation motion between the first and second face regions in respective frames. In this regard, the verification includes determining integral gradient projections for the window in the second frame following movement of the window by the translation motion between the first and second face regions. The verification also includes determining integral gradient projections for a face region in the first frame and determining a distance between the integral gradient projections of the window, following movement by the translation motion, and the face region. Further, the verification includes determining whether the translation motion is verified based on a relationship between the distance and a predefined threshold.

In one embodiment, a method is provided that includes determining a transfer function relating integral projection curves of a face region in a first frame that has a predefined position and a predetermined size and a co-located window of the same size in a second frame. The method of this embodiment also determines a scaling factor by using integral projections of the first face regions and second face region based upon the transfer function. To compute the distance between two face regions of different scale, initially the scale difference is compensated by applying the transfer function to co-ordinates of the integral projections of the face region of the first frame. The method may also determine a distance between the integral projections of the face region in the first frame that are transformed using the transfer function and the window in the second frame and may determine whether the scaling factor is verified based on a relationship between the distance and a predefined threshold.

The determination of the transfer function may include determining a transfer function line that provides a minimum point-to-point distance between the integral projection curves. The determination of the scaling factor may include determining the scaling factor based upon scaling factors in first and second mutually orthogonal directions. The method of one embodiment may also include performing a face search using a pattern recognition based face classifier in an instance in which the scaling factor is not verified in that the distance fails to satisfy the predefined threshold. In addition, the method of one embodiment may also include redefining the predetermined size for other frames based upon the scaling factor in an instance in which the scaling factor is verified.

In another embodiment, an apparatus is provided that includes at least one processor and at least one memory including computer program code configured to, with the at least one processor, cause the apparatus to determine a transfer function relating integral projection curves of a face region in a first frame that has a predefined position and a predetermined size and a co-located window in a second frame with the same size. The at least one memory including the computer program code may also be configured in this embodiment to, with the at least one processor, cause the apparatus to determine a scaling factor based upon the transfer function and integral projections for the windows in the first and second frames. The at least one memory including the computer program code may also be configured to, with the at least one processor, cause the apparatus to determine a distance between the integral projections of the face region in the first frame and the window in the second frame that has a size that is based upon the scaling factor and to determine whether the scaling factor is verified based on a relationship between the distance and a predefined threshold.

The determination of the transfer function may include determining a transfer function line that provides a minimum point-to-point distance between the integral projection curves. The point to point distance between two face projection curves at a particular scale factor is computed by first compensating the integral projection curves for the face region of the first frame for scale and using this to compute the point to point distance with the integral projection curves of the face region for the second frame. The determination of the scaling factor may include determining the scaling factor based upon scaling factors in first and second mutually orthogonal directions. The at least one memory including the computer program code may also be configured in one embodiment to, with the at least one processor, cause the apparatus to perform a face search using a pattern recognition based face classifier in an instance in which the scaling factor is not verified in that the distance fails to satisfy the predefined threshold. In addition, the at least one memory including the computer program code may also be configured to, with the at least one processor, cause the apparatus to redefine the predetermined size for other frames based upon the scaling factor in an instance in which the scaling factor is verified.

In a further embodiment, a computer program product is provided that includes at least one non-transitory computer-readable storage medium having computer-readable program instructions stored therein with the computer-readable program instructions including program instructions configured to determine a transfer function relating integral projection curves of a face region in a first frame that has a predefined position and a predetermined size and a co-located window of same size in a second frame. The computer-readable program instructions also include program instructions configured to determine a scaling factor based upon the transfer function and using integral projections for the face region in first frame and of the window in the second frame. The computer-readable program instructions may also include program instructions configured to determine a distance between the integral projections of the face region in the first frame and the window in the second frame that has a size that is based upon the scaling factor and program instructions configured to determine whether the scaling factor is verified based on a relationship between the distance and a predefined threshold.

In yet another embodiment, an apparatus is provided that includes means for determining a transfer function relating integral projection curves of a face region in a first frame that has a predefined position and a predetermined size and a co-located window of same size in a second frame. The apparatus of this embodiment also includes means for determining a scaling factor based upon the transfer function using integral projections of the face region in the first frame and for the window in the second frame with the window having a size that is based upon the scaling factor. The apparatus may also include means for determining a distance between the integral projections of the face region in the first frame and the window in the second frame that has a size that is based upon the scaling factor and means for determining whether the scaling factor is verified based on a relationship between the distance and a predefined threshold.

In yet a further embodiment, a computer program is provided that, upon execution, is configured to determine a transfer function relating integral projection curves of a face region in a first frame that has a predefined position and a predetermined size and a co-located window of same size in a second frame. The computer program is also configured, upon execution, to determine a scaling factor based upon the transfer function and using integral projections for the face region in first frame and of the window in the second frame. The computer program is further configured to determine a distance between the integral projections of the face region in the first frame and the window in the second frame that has a size that is based upon the scaling factor and to determine whether the scaling factor is verified based on a relationship between the distance and a predefined threshold.

BRIEF DESCRIPTION OF THE DRAWINGS

Figure 1:
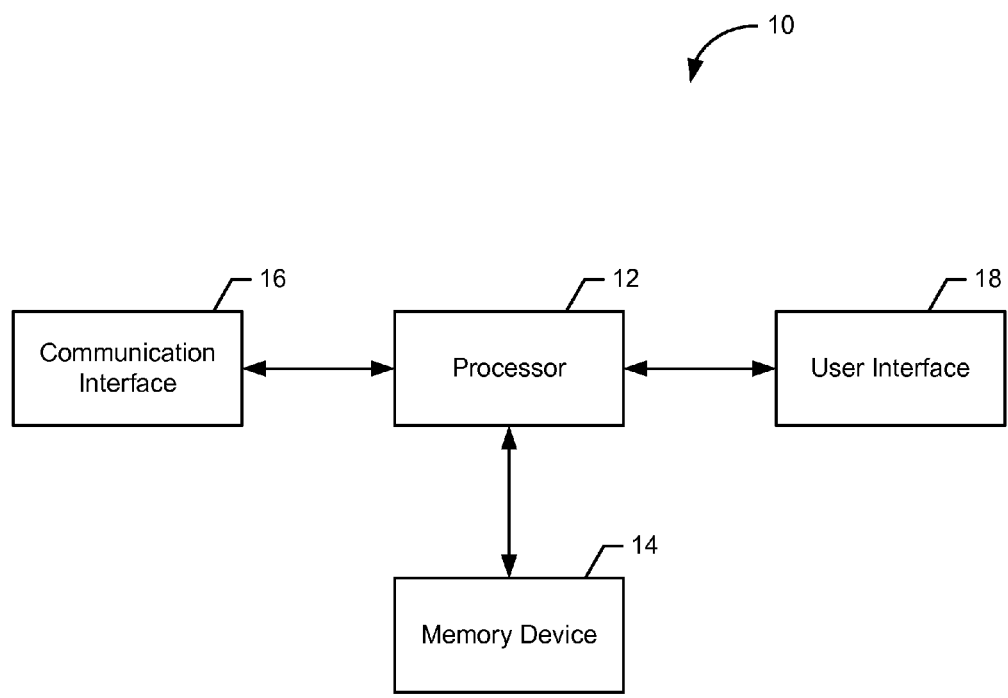
Figure 2:
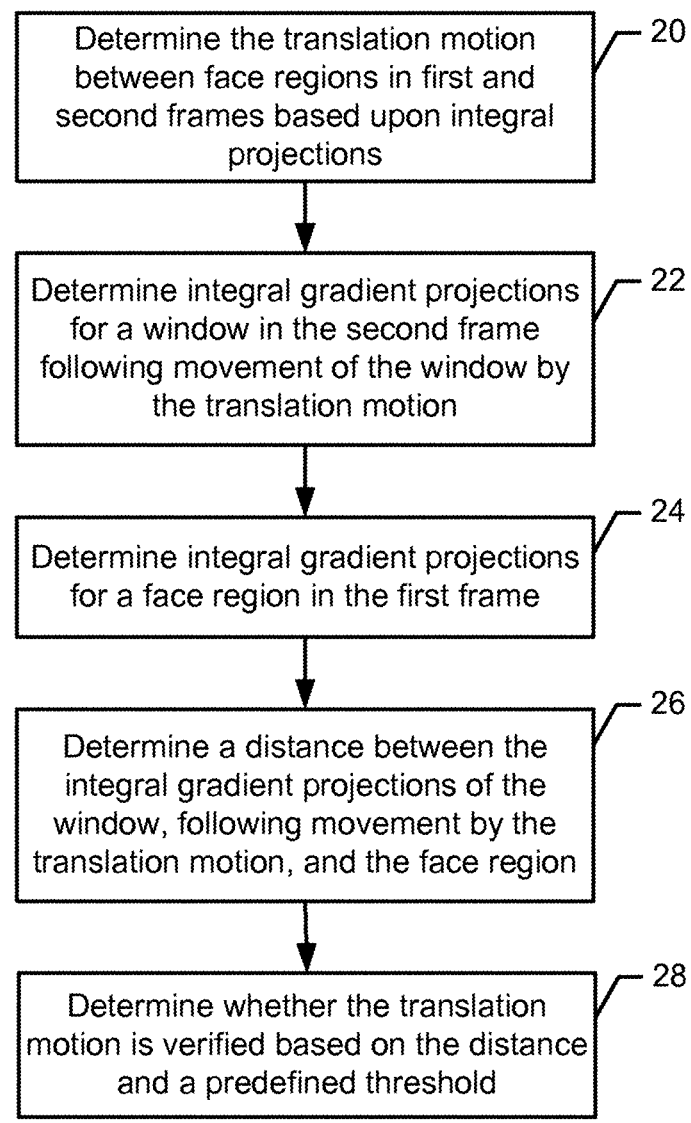
Figure 3:
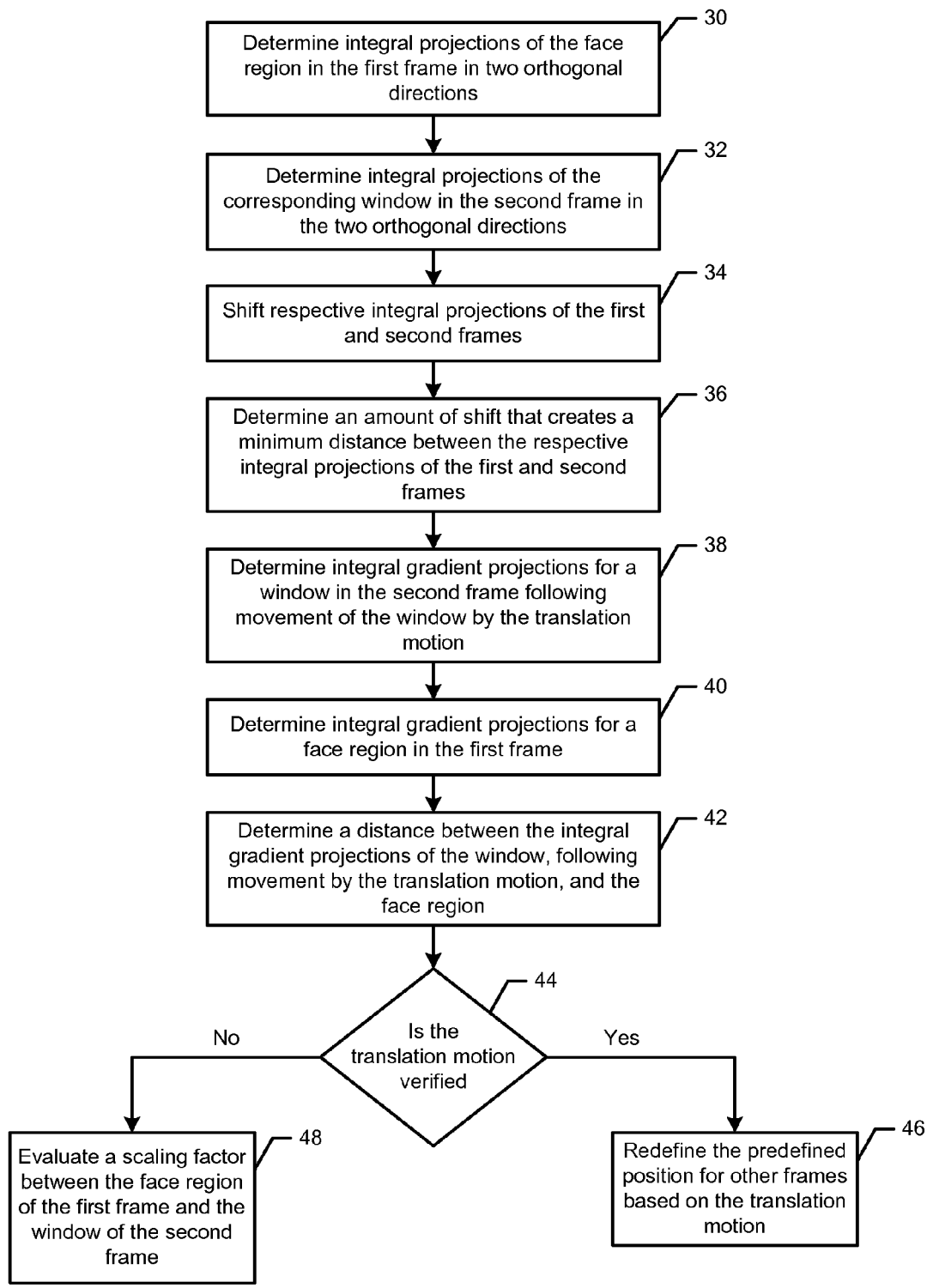
Figure 4:
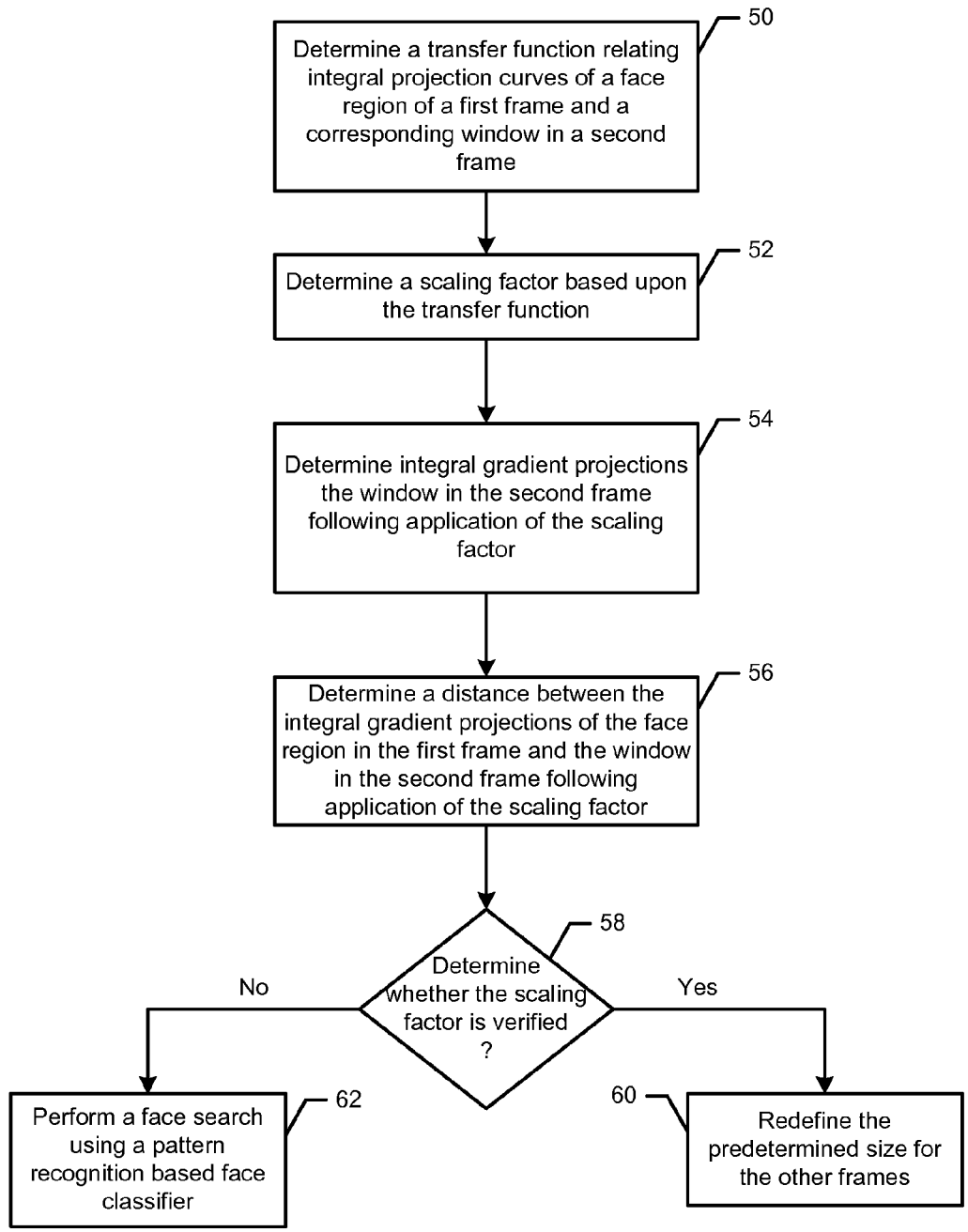
Figure 5:
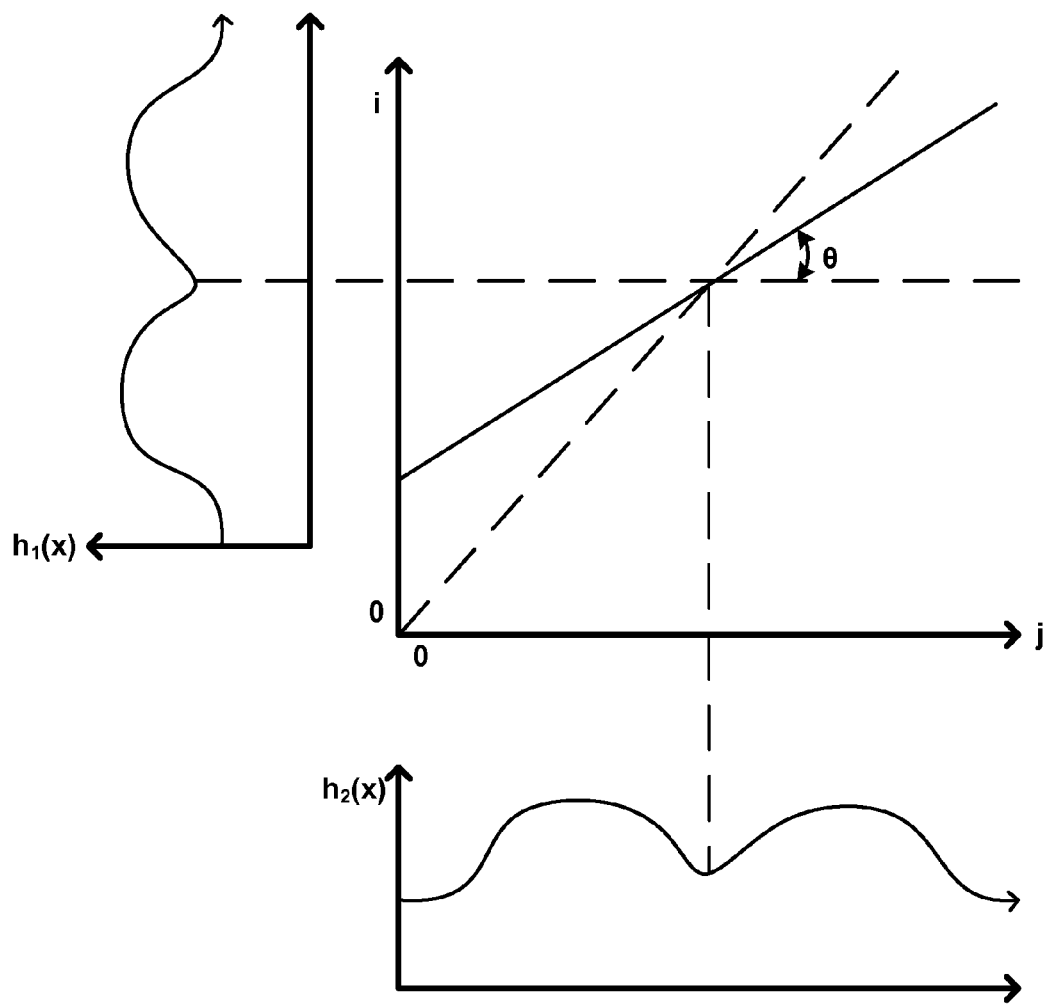

Having thus described certain example embodiments of the invention in general terms, reference will now be made to the accompanying drawings, which are not necessarily drawn to scale, and wherein:

FIG. 1 is a block diagram of an apparatus for performing face tracking including estimation of translation motion and/or a scaling factor in accordance with one example embodiment of the present invention;

FIG. 2 is a flowchart illustrating a method for determining a translation motion between first and second frames in accordance with one example embodiment of the present invention;

FIG. 3 is a flowchart illustrating the operations performed in order to determine the translation motion between first and second frames in accordance with another example embodiment of the present invention;

FIG. 4 is a flowchart illustrating the operations performed in order to determine the scaling factor between first and second frames in accordance with one example embodiment of the present invention; and FIG. 5 is a graphical representation of a transfer function that may assist with the determination of a scaling factor between first and second frames in accordance with one example embodiment of the present invention.

DETAILED DESCRIPTION

Some example embodiments of the present invention will now be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. Like reference numerals refer to like elements throughout.

As used herein, the terms "data," "content," "information" and similar terms may be used interchangeably to refer to data capable of being transmitted, received, displayed and/or stored in accordance with various example embodiments. Thus, use of any such terms should not be taken to limit the spirit and scope of the disclosure.

The term "computer-readable medium" as used herein refers to any medium configured to participate in providing information to a processor, including instructions for execution. Such a medium may take many forms, including, but not limited to a non-transitory computer-readable storage medium (for example, non-volatile media, volatile media), and transmission media. Transmission media include, for example, coaxial cables, copper wire, fiber optic cables, and carrier waves that travel through space without wires or cables, such as acoustic waves and electromagnetic waves, including radio, optical and infrared waves. Examples of non-transitory computer-readable media include a floppy disk, hard disk, magnetic tape, any other non-transitory magnetic medium, a compact disc read only memory (CD-ROM), compact disc compact disc-rewritable (CD-RW), digital versatile disc (DVD), Blu-Ray, any other non-transitory optical medium, a random access memory (RAM), a programmable read only memory (PROM), an erasable programmable read only memory (EPROM), a FLASH-EPROM, any other memory chip or cartridge, or any other non-transitory medium from which a computer can read. The term computer-readable storage medium is used herein to refer to any computer-readable medium except transmission media. However, it will be appreciated that where embodiments are described to use a computer-readable storage medium, other types of computer-readable mediums may be substituted for or used in addition to the computer-readable storage medium in alternative embodiments.

Additionally, as used herein, the term 'circuitry' refers to (a) hardware-only circuit implementations (for example, implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device, and/or other computing device.

An apparatus 10 for performing face tracking in accordance with an example embodiment of the present invention is shown in FIG. 1. The apparatus may be embodied in a wide variety of computing devices, such as mobile terminals, e.g., mobile telephones, mobile computers, personal digital assistants (PDAs), pagers, laptop computers, desktop computers, gaming devices, televisions and other types of mobile electronic systems, or various fixed computing devices, such as workstations, personal computers or the like. It should also be noted that while FIG. 1 illustrates one example of a configuration of an apparatus for performing face tracking, numerous other configurations may also be used to implement embodiments of the present invention. As such, in some embodiments, although devices or elements are shown as being in communication with each other, hereinafter such devices or elements should be considered to be capable of being embodied within a same device or element and thus, devices or elements shown in communication should be understood to alternatively be portions of the same device or element.

Referring now to FIG. 1, the apparatus 10 for performing face tracking is provided and may include or otherwise be in communication with a processor 12, a memory device 14, a communication interface 16 and a user interface 18. In some embodiments, the processor (and/or co-processors or any other processing circuitry assisting or otherwise associated with the processor) may be in communication with the memory device via a bus for passing information among components of the apparatus. The memory device may include, for example, one or more volatile and/or non-volatile memories. In other words, for example, the memory device may be an electronic storage device (e.g., a computer readable storage medium) comprising gates configured to store data (e.g., bits) that may be retrievable by a machine (e.g., a computing device like the processor). The memory device may be configured to store information, data, applications, instructions or the like for enabling the apparatus to carry out various functions in accordance with an example embodiment of the present invention. For example, the memory device could be configured to buffer input data for processing by the processor. Additionally or alternatively, the memory device could be configured to store instructions for execution by the processor.

The apparatus 10 may, in some embodiments, be a mobile terminal or other computing device configured to employ an example embodiment of the present invention. However, in some embodiments, the apparatus may be embodied as a chip or chip set. In other words, the apparatus may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The apparatus may therefore, in some cases, be configured to implement an embodiment of the present invention on a single chip or as a single "system on a chip." As such, in some cases, a chip or chipset may constitute means for performing one or more operations for providing the functionalities described herein.

The processor 12 may be embodied in a number of different ways. For example, the processor may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor may include one or more processing cores configured to perform independently. A multi-core processor may enable multiprocessing within a single physical package. Additionally or alternatively, the processor may include one or more processors configured in tandem via the bus to enable independent execution of instructions, pipelining and/or multithreading.

In an example embodiment, the processor 12 may be configured to execute instructions stored in the memory device 14 or otherwise accessible to the processor. Alternatively or additionally, the processor may be configured to execute hard coded functionality. As such, whether configured by hardware or software methods, or by a combination thereof, the processor may represent an entity (e.g., physically embodied in circuitry) capable of performing operations according to an embodiment of the present invention while configured accordingly. Thus, for example, when the processor is embodied as an ASIC, FPGA or the like, the processor may be specifically configured hardware for conducting the operations described herein. Alternatively, as another example, when the processor is embodied as an executor of software instructions, the instructions may specifically configure the processor 102 to perform the algorithms and/or operations described herein when the instructions are executed. However, in some cases, the processor may be a processor of a specific device (e.g., a mobile terminal or other computing device), such as processor of a mobile terminal, adapted for employing an embodiment of the present invention by further configuration of the processor by instructions for performing the algorithms and/or operations described herein. The processor may include, among other things, a clock, an arithmetic logic unit (ALU) and logic gates configured to support operation of the processor.

Meanwhile, the communication interface 16 may be any means such as a device or circuitry embodied in either hardware or a combination of hardware and software that is configured to receive and/or transmit data from/to a network and/or any other device or module in communication with the apparatus 10. In this regard, the communication interface may include, for example, an antenna (or multiple antennas) and supporting hardware and/or software for enabling communications with a wireless communication network. Additionally or alternatively, the communication interface may include the circuitry for interacting with the antenna(s) to cause transmission of signals via the antenna(s) or to handle receipt of signals received via the antenna(s). In some environments, the communication interface may alternatively or also support wired communication. As such, for example, the communication interface may include a communication modem and/or other hardware/software for supporting communication via cable, digital subscriber line (DSL), universal serial bus (USB) or other mechanisms.

The user interface 18 may be in communication with the processor 12 to receive an indication of a user input at the user interface and/or to cause provision of an audible, visual, mechanical or other output to the user. As such, the user interface 18 may include, for example, a keyboard, a mouse, a joystick, a display, a touch screen(s), touch areas, soft keys, a microphone, a speaker, or other input/output mechanisms. Alternatively or additionally, the processor may comprise user interface circuitry configured to control at least some functions of one or more elements of the user interface, such as, for example, a speaker, ringer, microphone, display, and/or the like. The processor and/or user interface circuitry comprising the processor may be configured to control one or more functions of one or more elements of the user interface through computer program instructions (e.g., software and/or firmware) stored on a memory accessible to the processor (e.g., memory device 14, and/or the like).

As shown in FIG. 2, a method of determining the translation motion, if any, between two frames in which a face was tracked is shown. Prior to determining the translation motion between face regions in successive frames, a face is detected in a first frame. The face may be detected in the first frame by any general object detection method, such as the Viola-Jones method. Once a face has been detected in the first frame, the position of the face, such as the center of the face denoted (x0, y0) and the size of the face denoted M×M are determined. Thereafter, the translation motion of the face region in between the first frame and a subsequent, second frame, may be determined. In this regard, the apparatus 10 may include means, such as the processor 12 or the like, for determining the translation motion between the first and second frames based upon respective integral projection of the face region in the first frame that has a predefined position (x0, y0) and a predetermined size M×M and a window in the second frame around the predefined position (x0, y0) that has the predetermined size M×M. See operation 20 of FIG. 2.

Further details regarding the determination of the translation motion between the first and second frame are provided by the flowchart of FIG. 3 such that reference is now made to FIG. 3 and, in particular, to operation 30 of FIG. 3. In this regard, the apparatus 10 may include means, such as the processor 12 or the like, for determining integral projections of the face region in the first frame in first and second mutually orthogonal directions, such as x and y directions. For example, the horizontal and vertical integral projection curves h(y) and v(x) for the face region of size M×M in the first frame I(x,y) may be determined as follows:

$h(y) = \Sigma_{x \in \{-M/2, M/2\}} |I(x-x0, y-y0)|$ where $y \in \{-M/2, M/2\}$ for the face centered at [x0, y0]

$v(x) = \Sigma_{y \in \{-M/2, M/2E\}} |I(x-x0, y-y0)|$ where $x \in \{-M/2, M/2\}$ for the face centered at [x0, y0]

As shown in operation 32 of FIG. 3, the apparatus 10 may also include means, such as processor 12 or the like, for determining the integral projection curves for the corresponding window in the second frame in the first and second mutually orthogonal directions, such as the x and y directions. The integral projection curves of the window in the second frame may be determined in various manners including as follows:

$h'(y) = \Sigma_{x \subset \{-M/2, M/2\}} |I'(x-x0, y-y0)|$ where $y \in \{-M/2, M/2\}$ for the face centered at [x0, y0]

$v'(x) = \Sigma_{y \in \{-M/2, M/2\}} |I'(x-x0, y-y0)|$ where $x \in \{-M/2, M/2\}$ for the face centered at [x0, y0]

where h'( ) represents the horizontal integral projection curves and v'( ) represents the vertical integral projection curves in the second frame I'(x,y).

Based upon these integral projections, the translation motion of the face region between the first frame I(x,y) and the second frame I'(x,y) may then be determined. As shown in operation 34 of FIG. 3, the apparatus 10 may include means, such as the processor 12 or the like, for shifting the integral projection curves of the first and second frames. The apparatus 10 of this embodiment may also include means, such as the processor 12 or the like, for determining the amount of shift that creates a minimum distance between the respective integral projection curves of the first and second frames as shown in operation 36 of FIG. 3. By way of example, the translation motion in the x direction may be obtained by shifting the vertical integral projection curves for the first and second frames, e.g., v(x) and v'(x) as described above, and determining the amount of shift which results in the minimum distance $d_x$ between the two vertical integral projection curves. In one embodiment, for example, the minimum distance $d_x$ between the vertical integral projection curves for the first and second frames may be determined as follows:

$$d_x = \arg\min x \left\{ \sum_{i=[1,m]} |v(i) - \alpha * v'(x+i)| \right\}$$

$$\text{where } \alpha = \left( \sum_{i=[1,M]} v(i) \right) \bigg/ \sum_{i=[1:M]} v'(i)$$

Similarly, the motion in the y direction may be obtained by shifting the horizontal integral projection curves for the first and second frames, e.g., h(y) and h'(y) as described above, and determining the amount of shift which results in the minimum distance $d_y$ between the two horizontal integral projection curves. In one embodiment, for example, the minimum distance $d_y$ between the horizontal integral projection curves for the first and second frames may be determined as follows:

$$d_y = \arg\min y \left\{ \sum_{i=[1,m]} |h(i) - \beta * h'(y+i)| \right\}$$

$$\text{where } \beta = \left( \sum_{i=[1,M]} h(i) \right) \bigg/ \sum_{i=[1:M]} h'(i)$$

Once the translation motion has been determined, the method and apparatus 10 of one example embodiment may verify the translation motion between the first and second frames. As shown in operation 22 of FIG. 2 and operation 38 of FIG. 3, the apparatus 10 may include means, such as a processor 12 or the like, for determining integral gradient projections for the window in the second frame following movement of the window by the translation motion that was determined between the first and second frames. In accordance with the foregoing example, the window in the second frame I'(x,y) may be moved by the translation motion that was determined to be ($d_x$, $d_y$). Following the movement of the window in the second frame I'(x,y), the integral gradient projection of the window in the second frame in the x and y direction may be determined as follows with h''(x) representing the horizontal projection of the vertical gradient and v''(y) representing the vertical projection of the horizontal gradient:

$h''(x) = \Sigma_{y \in \{-M/2, M/2\}} |I'(x+dx-x0, y+dy-y0)-I(x+dx-x0, y+dy+1-y0)|$ where $x \in \{-M/2, M/2\}$ $v''(y) = \Sigma_{x \in \{-M/2, M/2\}} |I'(x+dx-x0, y+dy-y0)-I(x+dx+1-x0, y+dy-y0)|$ where $y \in \{-M/2, M/2\}$ As shown in operation 24 of FIG. 2 and operation 40 of FIG. 3, the apparatus 10 may also include means, such as a processor 12 or the like, for determining the integral gradient projections for a face region in the first frame. For example, the horizontal projection $h_g(x)$ of the vertical gradient and the vertical projection $v_g(y)$ of the horizontal gradient in the first frame I(x,y) may be determined as follows:

$h_g(x) = \Sigma_{y \in \{-M/2, M/2\}} |I(x-x0, y-y0)-I(x-x0, y+1-y0)|$ where $x \in \{-M/2, M/2\}$ for the face centered at [x0, y0]

$V_g(y) = \Sigma_{x \in \{-M/2, M/2\}} |I(x-x0, y-y0)-I(x+1-x0, y-y0)|$ where $y \in \{-M/2, M/2\}$ for the face centered at [x0, y0]

By performing the verification of the translation motion utilizing the integral gradient projections, the method and apparatus 10 of example embodiments of the present invention may avoid the disadvantageous effects of illumination so as to more accurately estimate the translation motion.

As shown in operation 26 of FIG. 2 and operation 42 of FIG. 3, the apparatus 10 may also include means, such as processor 12 or the like, for determining a distance between the integral gradient projections of the window, following movement by the translation motion, and the face region. In this regard, the distances in the x and y directions, $fd_x$, $fd_y$, may be determined between the horizontal integral gradient projection curves of the first and second frames and the vertical integral gradient projection curves of the first and second frames as follows:

$$fd_x = \sum_{x=[1,M]} \{h''(x) - h_g(x)\}$$

$$fd_y = \sum_{y=[1,M]} \{v''(y) - v_g(y)\}$$

The apparatus 10 may also include means, such as a processor 12 or the like, for determining whether the translation motion is verified based on a relationship between the distance between the integral gradient projections and a predefined threshold thr1, as shown in operation 28 of FIG. 2 and operation 44 of FIG. 3. In one example, the apparatus, such as a processor, may verify the translation motion of the face between the first and second frames in an instance in which the distances are less than the predefined threshold, e.g., $fd_x$<thr1 and $fd_y$<tthr1. While the same predefined threshold thr1 is utilized in conjunction with both the distance between integral gradient projections in the x direction and the distance between the integral gradient projections in the y direction, different predefined thresholds may be utilized in the x and y directions in other embodiments. In an instance in which the translation motion of the face is between the first and second frames is verified, the apparatus may include means, such as a processor 12 or the like, for redefining the predefined position of other frames such as subsequent frames, based upon the translation motion. See operation 46 of FIG. 3. In other words, the predefined position of the face region about which the face region is centered may be updated based upon the translation motion that was identified as described above. However, if the apparatus, such as the processor, fails to verify the translation motion, such as in an instance in which the distance between the integral gradient projections fails to satisfy the predefined threshold, e.g., $fd_x$>thr1 or $fd_y$>thr1, the method, apparatus and computer program product of one embodiment may then evaluate a scaling factor between the face region of the first frame and the window of the second frame so as to determine possible scaling therebetween, as shown in operation 48 of FIG. 3 and as described below in conjunction with FIG. 4.

The method, apparatus and computer program product of the example embodiment of the present invention as described above in conjunction with FIGS. 2 and 3, for example, may provide a substantial computational advantage with increased computational efficiency by determining integral gradient projections for only the face region in the first frame and a corresponding window in the second frame, as opposed to larger portions or, indeed, the entirety of the frame and by estimating the translation motion utilizing a one-dimensional search.

In an instance in which the translation motion is not verified, such as in an instance in which the distance between the integral gradient projections fails to satisfy a predefined threshold, the method, apparatus and computer program product of one example embodiment may then analyze the integral projection curve for the presence of scaling between the face region of the first frame and the corresponding window of the second frame. While scaling may be introduced for a variety of reasons, scaling may generally occur in an instance in which either the face or the image capturing device, e.g., camera, moves relative to the other, such as closer or further relative to the other.

In accordance with this embodiment, the apparatus 10 may include means, such as the processor 12 or the like, for determining a transfer function relating the integral gradient projections curves of the face region of the first frame and the corresponding window in the second frame. See operation 50 of FIG. 4. By way of example, reference is now made to FIG. 5 in which $h_1(x)$ and $h_2(2)$ are the horizontal integral projection curves for the face region of the first frame and the corresponding window of the second frame, respectively. In order to determine the transfer function, the apparatus 10 of one example embodiment may include means, such as a processor 12 or the like, for determining a transfer function line that provides a minimum point-to-point distance between the integral projection curves. In regards to the embodiment of FIG. 5, for example, the transfer function line may be defined as i=m*j+c. In this regard, j is the indices of $h_2(x)$ and i is the indices of $h_1(x)$. Moreover, the distance between the integral projection curves of this example embodiment is defined to be the sum of the absolute difference between the two curves.

Of the plurality of potential mappings between the two curves, the search of one example embodiment may be constrained to a search for the slope m in which m is defined to between 0.75 and 1.25 since the scale change of the face region will generally not change by more than 1.25 times within two frames. The slope for the transfer function line between the horizontal integral projection curves may be determined in this example embodiment as follows:
$m_x = \arg\min_m\{|h2(j) - h1(m*j+c_k)|\}$ whereas m ∈ (0.75, 01.25)
In this regard, $c_k$ may be determined by assuming that the integral transfer function line crosses a diagonal line that extends through the origin and is shown as a dashed line in FIG. 5 at (k*M/4, k*M/4) with M being the length of the line and k being an element of [0,3]. Although described above in conjunction with the determination of the slope $m_x$ of the transfer function line between the horizontal integral projection curves, the apparatus 10 may also include means, such as a processor 12 or the like, for determining the slope $m_y$ of the transfer function line that relates the vertical integral projection curves of the face region of the first frame and the corresponding window of the second frame.

The determination of the optimal mapping between the integral projection curves by the transfer function, such as the transfer function line, may also be viewed graphically by fixing a pivot at some point on the diagonal line represented by dashed lines in FIG. 5 and then rotating the transfer function line to different angles θ corresponding to different slopes m, with the optimal mapping being defined by the transfer function line that provides the minimum distance as defined by the foregoing equations for $m_x$ and $m_y$. In this analysis, it is noted that the pivot may be fixed at four different places, that is, at (k*M/4, k*M/4) with k being an element [0,3].

The apparatus 10 of one example embodiment may also include means, such as a processor 12 or the like, for determining the scaling factor based upon the scaling factors in the x and y directions. See operation 52 of FIG. 4. In this regard, the scaling factor $m_f$ may be determined to be the average of $m_x$ and $m_y$, that is, $m_f=(m_x+m_y)/2$. Based upon the scaling factor, the size of the window in the second frame may be modified based upon the scaling factor, such as being increased or decreased in size based on the scaling factor. As shown in operation 54 of FIG. 4, the apparatus 10 may also include means, such as a processor 12 or the like, for determining the integral gradient projection curve for the window in the second frame following resizing of the window based upon the scaling factor. In this regard, the horizontal and vertical integral gradient projection curves h"(x) and v"(y) may be determined as described above, albeit with a resized or scaled window. The apparatus 10 of one example embodiment may also include means, such as processor 12 or the like, for redefining the lengths of the horizontal and vertical integral gradient projection curves h"(x) and v"(y) to be the same as the projection length for the first frame, that is, M.

The apparatus 10 of one embodiment may also include means, such as the processor 12 or the like, for determining a distance between the integral gradient projection curves of the face region in the first frame and the resized window in the second frame, such as in the manner described above in conjunction with the equations for $fd_x$ and $fd_y$. See operation 56 of FIG. 4. Thereafter, the apparatus 10 may include means, such as a processor 12 or the like, for determining whether the scaling factor is verified based on a relationship between the distance between the integral gradient projections and a predefined threshold. See operation 58. For example, the scaling factor may be verified by comparing the distances $fd_x$ and $fd_y$ to a predefined threshold thr1 as described above in conjunction with operation 28 of FIG. 2 and operation 44 of FIG. 3. While the same threshold is utilized as that described above, a different threshold may be utilized and, indeed, a different threshold may be used for the x and y directions in one embodiment. In an instance in which the scaling factor is verified, the apparatus 10 may include means such as the processor 12 or the like, for redefining the predetermined size of the face region and the corresponding window for other frames, such as subsequent frames, based upon the scaling factor. See operation 60 of FIG. 4. Alternatively, in an instance in which the scaling factor is not verified, such as by one or more of the distances failing to satisfy the predefined threshold, the method, apparatus and computer program product of one example embodiment may perform a face search utilizing a pattern recognition based face classifier as shown in operation 62 of FIG. 4.

In an instance in which neither the translation motion nor the scaling factor is verified, there may have been pose changes and substantial blurs between the first and second frames. As such, the apparatus 10 may include means, such as the processor 12 or the like, for performing a constrained face search using a pattern recognition based face classifier. This face search may be performed for a predetermined number of face sizes, such as x, 1.25x and 0.75x, with x being the face size for the face that was previously found. For each face size, the apparatus, such as a processor, may perform the face search in a region of interest surrounding the location at which the face was previously located in a prior frame. By performing a face search using a pattern recognition based face classifier for the predetermined number of face sizes, a face may still be found in the first and second frames in the event of pose changes and massive blurs in some instances.

The use of integral gradient projections may be advantageous in order to identify translation motion and/or scaling in a reliable fashion, particularly with respect to video in which translation and zoom or scaling occurs regularly. By determining translation motion and/or scaling in a manner that is successfully verified in a meaningful percentage of instances, the face tracking may be successful in a large number of instances, thereby increasing the efficiency of the face tracking process.

As described above, FIGS. 2-4 are flowcharts of a method and program product according to example embodiments of the invention. It will be understood that each block of the flowcharts, and combinations of blocks in the flowcharts, may be implemented by various means, such as hardware, firmware, processor, circuitry and/or other device associated with execution of software including one or more computer program instructions. For example, one or more of the procedures described above may be embodied by computer program instructions. In this regard, the computer program instructions which embody the procedures described above may be stored by a memory device 14 of an apparatus 10 and executed by a processor 12 of the apparatus 10. As will be appreciated, any such computer program instructions may be loaded onto a computer or other programmable apparatus (e.g., hardware) to produce a machine, such that the instructions which execute on the computer or other programmable apparatus create means for implementing the functions specified in the flowcharts' blocks. These computer program instructions may also be stored in a non-transitory computer-readable memory that may direct a computer or other programmable apparatus to function in a particular manner, such that the instructions stored in the computer-readable memory produce an article of manufacture which implements the functions specified in the flowcharts' blocks. The computer program instructions may also be loaded onto a computer or other programmable apparatus to cause a series of operations to be performed on the computer or other programmable apparatus to produce a computer-implemented process such that the instructions which execute on the computer or other programmable apparatus implement the functions specified in the flowcharts' blocks.

Accordingly, blocks of the flowcharts of FIGS. 2-4 support combinations of means for performing the specified functions and combinations of operations for performing the specified functions. It will also be understood that one or more blocks of the flowcharts, and combinations of blocks in the flowcharts, can be implemented by special purpose hardware-based computer systems which perform the specified functions, or combinations of special purpose hardware and computer instructions.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe some example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A method comprising:
    determining at least one transfer function relating integral projection curves of a face region in a first frame, wherein the face region has a predefined position and a predetermined size, and of a first window in a second frame, wherein the first window is co-located in size and position with the face region;
    determining a scaling factor based upon the at least one transfer function;
    determining integral gradient projections for the face region in the first frame and for a second window in the second frame with the second window having a size that is based upon a size of the first window modified by the scaling factor;
    determining a distance between the integral gradient projections of the face region in the first frame and of the second window in the second frame; and
    determining whether the scaling factor is verified based on a relationship between the distance and a predefined threshold.

2. A method according to claim 1 wherein determining the transfer function comprises determining a transfer function line that provides a minimum point-to-point distance between the integral projection curves.

3. A method according to claim 1 wherein determining the scaling factor comprises determining the scaling factor based upon scaling factors in first and second mutually orthogonal directions.

4. A method according to claim 1 further comprising performing a face search using a pattern recognition based face classifier in an instance in which the scaling factor is not verified in because the distance fails to satisfy the predefined threshold.

5. A method according to claim 1 further comprising redefining the predetermined size for other frames based upon the scaling factor in an instance in which the scaling factor is verified.

6. An apparatus comprising:
    at least one processor; and
    at least one memory including computer program code configured to, with the at least one processor, cause the apparatus to perform at least the following:
    determine at least one transfer function relating integral projection curves of a face region in a first frame, wherein the face region has a predefined position and a predetermined size, and of a first window in a second frame, wherein the first window is co-located in size and position with the face region;
    determine a scaling factor based upon the at least one transfer function;
    determine integral gradient projections for the face region in first frame and for a second window in the second frame with the second window having a size that is based upon a size of the first window modified by the scaling factor;
    determine a distance between the integral gradient projections of the face region in the first frame and of the second window in the second frame; and
    determine whether the scaling factor is verified based on a relationship between the distance and a predefined threshold.

7. An apparatus according to claim 6 wherein the at least one memory including the computer program code is configured to, with the at least one processor, cause the apparatus to determine the transfer function based on a transfer function line that provides a minimum point-to-point distance between the integral projection curves.

8. An apparatus according to claim 6 wherein the at least one memory including the computer program code is configured to, with the at least one processor, cause the apparatus to determine the scaling factor based upon scaling factors in first and second mutually orthogonal directions.

9. An apparatus according to claim 6 wherein the at least one memory including the computer program code is further configured to, with the at least one processor, cause the apparatus to perform a face search by using a pattern recognition based face classifier in an instance in which the scaling factor is not verified because the distance fails to satisfy the predefined threshold.

10. An apparatus according to claim 6 wherein the at least one memory including the computer program code is further configured to, with the at least one processor, cause the apparatus to redefine the predetermined size for other frames based upon the scaling factor in an instance in which the scaling factor is verified.

11. A computer program product comprising at least one non-transitory tangible computer-readable storage medium having computer-readable program code portions stored therein, the computer-readable program code portions comprising:
    program code instructions configured to determine at least one transfer function relating integral projection curves of a face region in a first frame, wherein the face region has a predefined position and a predetermined size, and of a first window in a second frame, wherein the first window is co-located in size and position with the face region;
    program code instructions configured to determine a scaling factor based upon the at least one transfer function;

program code instructions configured to determine integral gradient projections for the face region in the first frame and for a second window in the second frame with the second window having a size that is based upon a size of the first window modified by the scaling factor;

program code instructions configured to determine a distance between the integral gradient projections of the face region in the first frame and of the second window in the second frame; and program code instructions configured to determine whether the scaling factor is verified based on a relationship between the distance and a predefined threshold.

12. A computer program product according to claim 11 wherein the program code instructions configured to determine the transfer function comprise program code instructions configured to determine a transfer function line that provides a minimum point-to-point distance between the integral projection curves.

13. A computer program product according to claim 11 wherein the program code instructions configured to determine the scaling factor comprise program code instructions configured to determine the scaling factor based upon scaling factors in first and second mutually orthogonal directions.

14. A computer program product according to claim 11 wherein the computer-readable program code portions further comprise program code instructions configured to perform a face search using a pattern recognition based face classifier in an instance in which the scaling factor is not verified because the distance fails to satisfy the predefined threshold.

15. A computer program product according to claim 11 wherein the computer-readable program code portions further comprise program code instructions configured to redefine the predetermined size for other frames based upon the scaling factor in an instance in which the scaling factor is verified.

16. An apparatus comprising:
at least one processor; and
at least one memory including computer program code configured to, with the at least one processor, cause the apparatus to perform at least the following:
determine a translation motion between first and second frames based upon integral projections of a face region in the first frame, wherein the face region has a predefined position and a predetermined size, and of a first window in the second frame, wherein the first window is co-located in size and position with the face region; and
verify the translation motion between the first and second frames, wherein the at least one memory including the computer program code is configured to, with the at least one processor, cause the apparatus to verify the translation motion by:
determining integral gradient projections for a second window in the second frame, wherein the second window is based on movement of the first window translated by the translation motion;
determining integral gradient projections for the face region in the first frame;
determining a distance between the integral gradient projections of the second window and of the face region; and
determining whether the translation motion is verified based on a relationship between the distance and a predefined threshold.

17. An apparatus according to claim 16 wherein the at least one memory including the computer program code is further configured to, with the at least one processor, cause the apparatus to:
determine the integral projections of the face region in the first frame in first and second mutually orthogonal directions; and
determine the integral projections for the window in the second frame in first and second mutually orthogonal directions.

18. An apparatus according to claim 16 wherein, to determine the translation motion, the at least one memory including the computer program code is configured to, with the at least one processor, cause the apparatus to:
shift respective integral projection curves of the first and second frames; and
determine an amount of shift that creates a minimum distance between the respective integral projection curves of the first and second frames.

19. An apparatus according to claim 16 wherein, to determine integral gradient projections for the window in the second frame following movement of the window by the translation motion, the at least one memory including the computer program code is configured to, with the at least one processor, cause the apparatus to determine integral gradient projections for the window in the second frame in first and second mutually orthogonal directions, and wherein the at least one memory including the computer program code is configured to, with the at least one processor, cause the apparatus to determine integral gradient projections for the face region in the first frame by determining integral gradient projections for the face region in the first frame in the first and second mutually orthogonal directions.

20. An apparatus according to claim 16 wherein the at least one memory including the computer program code is further configured to, with the at least one processor, cause the apparatus to redefine the predefined position for other frames based upon the translation motion in an instance in which the translation motion is verified.

21. An apparatus according to claim 16 wherein the at least one memory including the computer program code is further configured to, with the at least one processor, cause the apparatus to evaluate a scaling factor between the face region of the first frame and the window of the second frame in an instance in which the translation motion is not verified because the distance fails to satisfy predefined threshold.

* * * * *